Aug. 5, 1941.  A. L. PARKER  2,251,715
TUBE COUPLING
Filed Jan. 26, 1939
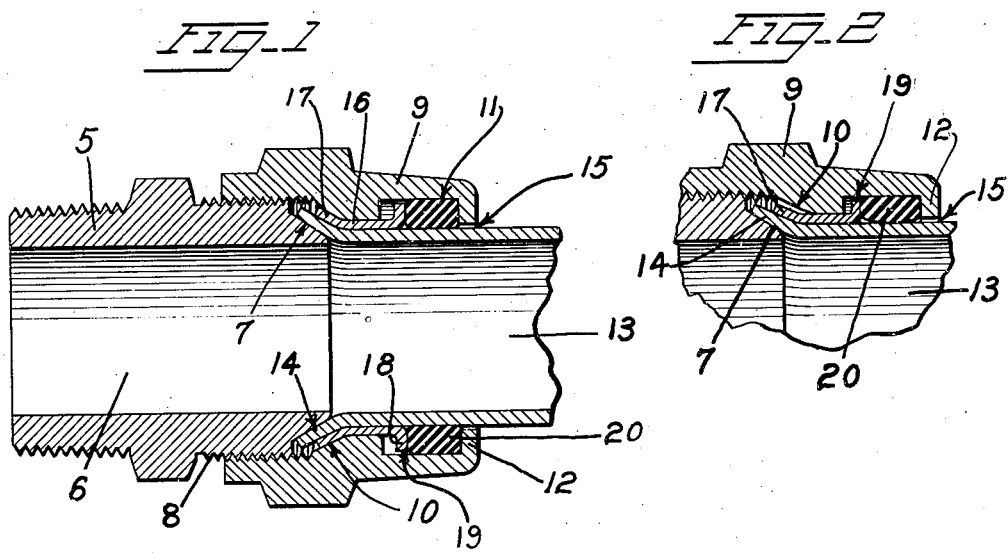
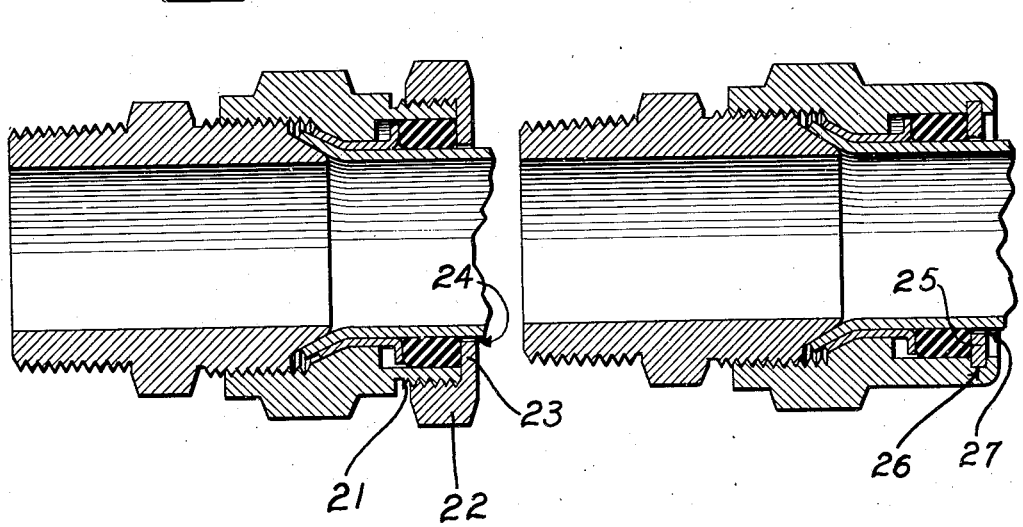
Inventor
Arthur L. Parker
By Mason & Porter
Attorneys Patented Aug. 5, 1941

2,251,715

UNITED STATES PATENT OFFICE 2,251,715

TUBE COUPLING

Arthur L. Parker, Cleveland, Ohio

Application January 26, 1939, Serial No. 252,984

4 Claims. (Cl. 285—86)

The invention relates generally to tube couplings, and primarily seeks to provide certain new and useful improvements in tube couplings of the type disclosed in U. S. Letters Patent 1,893,442, issued to Arthur L. Parker, January 3, 1933, said improvements being designed principally to protect the coupled tubes against failure due to vibration strains.

In tube couplings of the type stated the flared end of a tube to be coupled is clamped between coniform male and female clamping surfaces, and when the couplings thus formed are used in certain installations, of which aircraft uses form a good example, the tubes are subjected to more or less exaggerated vibration strains and often fail because of such strains. When these strains are localized by direct contact of the tubes with edge portions of the coupling parts, the chances of tube failure due to vibration strain are materially increased.

It is an object of the invention, therefore, to provide a novel tube coupling structure embodying a yieldable tube embracing ring which cushions the tube in a manner serving to dampen vibrations and prevent localized vibration strains likely to cause failure of the coupled tube.

In its more detailed nature, the invention resides in the provision of a tube coupling including male and female elements having opposing male and female coniform clamping surfaces between which the flared end of a tube is clamped, a clamping ring surrounding the tube within the female element and having a flared portion engaged by the female clamping surface and engaging the flared end of the tube in clamping relation and an abutment portion movable in an annular recess formed in said female element, said female element also having an abutment portion opposed to the abutment portion of the clamping ring, and a yieldable ring interposed between said abutment portions and compressed by engagement therewith for tightly embracing and yieldably supporting said tube against vibration strains.

Another object of the invention is to provide a tube coupling structure of the form stated in which the yieldable ring, during compression, serves to initially seat and apply clamping pressure to said clamping ring.

Another object of the invention is to provide a tube coupling of the form stated in which the yieldable ring engaging abutment portions of the female element and the clamping ring are respectively spaced out of contact with the exterior of the coupled tube and the interior of the female element.

With the above and other objects in view that will hereinafter appear, the nature of the invention will be more clearly understood by following the detailed description, the appended claims, and the several views illustrated in the accompanying drawing.

In the drawing,

Figure 1 is a central longitudinal sectional view of a tube coupling embodying the invention.

Figure 2 is a fragmentary section illustrating the relation of the parts before the tube is fully clamped, that is, during loose assembly.

Figure 3 is a view similar to Figure 1 illustrating a slightly modified arrangement of the parts in which the female element carried abutment portion is a separable element.

Figure 4 is a view similar to Figure 1 illustrating a slightly modified arrangement of the parts in which the female element carried abutment portion is a separate ring mounted in a receiving groove in the female element.

In the example of practical development of the invention illustrated in Figure 1 of the drawing, the male coupling element 5 includes the usual center bore or fluid passage 6 and terminates at one end in a coniform couple seat or male clamping surface 7 and is externally threaded as at 8 to threadably receive the female clamping element or nut 9.

The female clamping element 9 includes the usual coniform couple seat or clamping surface 10 and is also provided with an annular recess or chamber 11 defined at its outer end by an inwardly directed flange or abutment portion 12. The coupled tube 13, having an internal diameter proportioned to form a suitable continuation of the passage 6, includes the usual flared end 14 to be clamped between the opposed coniform clamping surfaces 7 and 10 of the male and female elements 5 and 9. It will be observed by reference to Figures 1 and 2 of the drawing, that the bore formed in the abutment flange 12 of the female element is large enough to form a definite clearance surrounding the tube 13, as is indicated at 15, so as to avoid direct contact between the female element and the tube at this point.

Within the female element 9 is slidably mounted a hard metal clamping sleeve 16, and this sleeve is flared at its inner end as at 17 for engagement with the external surface of the tube flare 14 and for being externally engaged by the clamping surface 10 of the female element 9. This sleeve terminates at its outer end in an outwardly turned abutment flange 18 movable in the annular recess 11 hereinbefore referred to. It will be observed that the external diameter of the abutment flange 18 is sufficiently small to be definitely spaced inwardly from and avoid direct contact with the opposing wall surface of the female element, as is indicated at 19.

A yieldable ring 20 is mounted in the annular recess 11 between the abutment portions or flanges 12 and 18, and when the female element or nut 9 is threaded into clamping position on the male element 5, the clamping sleeve 16 will be slid along the tube 13 into engagement with the tube flare 14 by pressure applied by the abutment flange 12 through the ring 20 and the abutment flange 18 in the manner indicated in Figure 2 of the drawing. This figure indicates the loose assembly of the coupling just prior to application of pressure through the yieldable ring 20.

When the coupling assembly of the elements 5 and 9 has been completed so as to tightly engage the coniform clamping surfaces 7 and 10 and the flared portions 14 and 17, the yieldable ring 20 will be compressed to tightly embrace and yieldably support the tube 13 against vibration strains.

By reason of the provision of the tightly compressed ring 20 and the spacing thereof from the clamped flare 14, vibrations of the tube will be dampened, and since direct contact between the abutment flanges 12 and 18 with the tube and the female clamping elements respectively is avoided by suitable spacing of these parts, localized vibration strains are avoided, and possibility of failure of the coupled tube 13 due to such strains is reduced to a minimum.

In Figure 3 of the drawing there is illustrated a slight modification of the coupling in which the female element includes an externally threaded portion 21 on which a nut or ring member 22 is threaded, and this member 22 carries the yieldable ring opposing abutment flange 23. As in the form of the invention previously described this abutment flange is spaced outwardly from the tube as at 24. In all other respects these coupling parts are identical with those previously described, and the cooperative relation and function of all parts is the same as has been previously described.

In Figure 4 of the drawing there is disclosed another slight modification of the coupling in which the yieldable ring opposing abutment portion is in the nature of a ring member 25 which is mounted in a receiving seat or groove 26 formed in the female element. In this form also the abutment portion or ring is spaced outwardly from the tube as at 27. Since the parts in this coupling are constructed and cooperate in the same manner as in the forms previously described, additional detailed description is thought to be unnecessary.

It is of course to be understood that the details of structure and arrangement of parts may be variously changed and modified without departing from the spirit and scope of my invention.

I claim:

1. In a tube coupling, male and female elements threadably engaged and including opposed coniform male and female clamping surfaces, a tube having a flared end clamped between said clamping surfaces, a clamping ring surrounding the tube within the female element and having a flared portion engaged by the female clamping surface and engaging the flared end of the tube and including an abutment portion, said female element having an annular recess therein surrounding the tube and into which the abutment portion extends and terminating in an abutment portion opposed to the clamping ring abutment portion, and a yieldable ring surrounding the tube in said recess and engaging said abutment portions whereby upon clamping of the tube said yieldable ring is compressed to tightly embrace and yieldably support the tube against vibration strain.

2. In a tube coupling, male and female elements threadably engaged and including opposed coniform male and female clamping surfaces, a tube having a flared end clamped between said clamping surfaces, a clamping ring surrounding the tube within the female element and having a flared portion engaged by the female clamping surface and engaging the flared end of the tube and including an abutment portion, said female element having an annular recess therein surrounding the tube and into which the abutment portion extends and terminating in an abutment portion opposed to the clamping ring abutment portion, and a yieldable ring surrounding the tube in said recess and engaging said abutment portions whereby upon clamping of the tube said yieldable ring is compressed to tightly embrace and yieldably support the tube against vibration strain, said clamping ring abutment portion being spaced inwardly from the female clamping element, and said female element abutment portion being spaced outwardly from the tube.

3. In a tube coupling, male and female elements threadably engaged and including opposed coniform male and female clamping surfaces, a tube having a flared end clamped between said clamping surfaces, a clamping ring surrounding the tube within the female element and having a flared portion engaged by the female clamping surface and engaging the flared end of the tube and including an abutment portion, said female element having an annular recess therein surrounding the tube and into which the abutment portion extends and terminating in an abutment portion opposed to the clamping ring abutment portion, and a yieldable ring surrounding the tube in said recess and engaging said abutment portions whereby upon clamping of the tube said yieldable ring is compressed to tightly embrace and yieldably support the tube against vibration strain, said female element carried abutment portion being mountable on and removable from said female element.

4. In a tube coupling a coupling member having a tapered seat adapted to engage the inner surface of the flared end of a tube, means for clamping a tube against said tapered seat including a metal sleeve surrounding the tube and having the inner end thereof tapered to conform to the outer surface of the tapered end of the tube and its outer end bent outwardly from the tube to form an abutment, an elastic ring surrounding the tube and adapted to engage the abutment on said sleeve, said clamping means having an inwardly extending means adapted to engage the outer face of said elastic ring, said abutment and said means cooperating to deform said elastic ring for forcing it into contact with the tube when the tube end is clamped in the coupling whereby the tube is supported against vibrations.

ARTHUR L. PARKER.